US009259027B2

(12) United States Patent
Hayes

(10) Patent No.: US 9,259,027 B2
(45) Date of Patent: Feb. 16, 2016

(54) SWEETENED BEVERAGES

(71) Applicant: Givaudan S.A., Vernier (CH)

(72) Inventor: Mariaelena Zuniga Hayes, West Chester, OH (US)

(73) Assignee: Givaudan S.A., Vernier (CH)

( * ) Notice: Subject to any disclaimer, the term of this patent is extended or adjusted under 35 U.S.C. 154(b) by 0 days.

(21) Appl. No.: 14/361,777

(22) PCT Filed: Dec. 19, 2012

(86) PCT No.: PCT/EP2012/076077
§ 371 (c)(1),
(2) Date: May 30, 2014

(87) PCT Pub. No.: WO2013/092657
PCT Pub. Date: Jun. 27, 2013

(65) Prior Publication Data
US 2014/0342078 A1    Nov. 20, 2014

Related U.S. Application Data

(60) Provisional application No. 61/577,248, filed on Dec. 19, 2011.

(51) Int. Cl.
*A23L 2/60* (2006.01)
*A23L 2/68* (2006.01)
*A23L 2/56* (2006.01)

(52) U.S. Cl.
CPC ... *A23L 2/60* (2013.01); *A23L 2/56* (2013.01); *A23L 2/68* (2013.01); *A23V 2002/00* (2013.01)

(58) Field of Classification Search
CPC .............. A23L 2/60; A23L 2/56; A23L 2/68; A23V 2250/032; A23V 2250/04
USPC ........................... 426/590, 599, 650, 548, 534
See application file for complete search history.

(56) References Cited

U.S. PATENT DOCUMENTS

| 3,285,751 | A | * | 11/1966 | Kracauer | 426/548 |
| 3,647,483 | A | * | 3/1972 | Eisenstadt | 426/548 |
| 3,684,529 | A | * | 8/1972 | Liggett | 426/548 |
| 5,310,570 | A | | 5/1994 | Kwapong et al. | |
| 5,472,716 | A | | 12/1995 | Kwapong et al. | |
| 2002/0004092 | A1 | | 1/2002 | Riha, III et al. | |
| 2003/0096047 | A1 | | 5/2003 | Riha, III et al. | |
| 2003/0211214 | A1 | | 11/2003 | Riha, III et al. | |
| 2008/0292765 | A1 | * | 11/2008 | Prakash | A23L 1/236 426/548 |
| 2010/0227039 | A1 | | 9/2010 | Ungureanu et al. | |

FOREIGN PATENT DOCUMENTS

| CN | 101742925 A | 6/2010 |
| CN | 101971896 A | 9/2010 |
| JP | 55114271 A | 9/1980 |
| WO | WO 93/13677 A1 | 7/1993 |
| WO | WO 2008/147727 A1 | 12/2008 |
| WO | WO 2010/025001 A1 | 9/2010 |

OTHER PUBLICATIONS

PCT/EP2012/076077—International Search Report, mailed on Apr. 17, 2013.
PCT/EP2012/076077—International Written Opinion, mailed on Apr. 17, 2013.
PCT/EP2012/076077—International Preliminary Report on Patentability, mailed on Jun. 24, 2014.
GB 1203662.0—British Search Report, mailed on Jun. 29, 2012.

* cited by examiner

*Primary Examiner* — Helen F Heggestad
(74) *Attorney, Agent, or Firm* — Curatolo Sidoti Co., LPA; Joseph G. Curatolo; Salvatore A. Sidoti

(57) ABSTRACT

Disclosed are flavored and juice beverages sweetened with Rebaudioside A (RebA) comprising an organic acid and glucono delta lactone.

9 Claims, No Drawings

SWEETENED BEVERAGES

CROSS REFERENCE TO RELATED APPLICATIONS

This application is a national stage application of International Application No. PCT/EP2012/076077, filed 19 Dec. 2012, which claims priority from U.S. Provisional Patent Application No. 61/577,248, filed 19 Dec. 2011, from which applications priority is claimed, and which are incorporated herein by reference.

This disclosure relates to beverages and beverage products sweetened with natural non-caloric sweeteners. In particular, it relates to flavored and juice beverages sweetened with Rebaudioside A (RebA).

The entire or partial replacement of sugar (sucrose) by a non-caloric sweetener, for example, in beverages is becoming more and more popular, in particular since natural ingredients such as stevioside (extract from the leaves of *Stevia rebaudiana*), Lo Han Guo (extract form the fruit of *Siraitia grosvenorii*), glyccerhizin, perillartine ((S)-4-(Prop-1-en-2-yl)cyclohex-1-ene-carbaldehyde oxime), mogroside V, rubusoside, rubus extract, and rebaudioside A (RebA) (one sweet component of stevioside), are commercially available for use in food products in many countries.

One problem with these natural non-caloric sweeteners, such as RebA, is that they have a long-lasting lingering effect and cause some bitterness at a level where sweetness is desired. Such off-notes limit the acceptance of compositions comprising them even though they are much healthier for people in need of cutting calories than compositions comprising sugar.

Another problem with RebA is that it delivers sweetness in the middle to finish of the tasting profile, then lingers, whereas sucrose delivers sweetness upfront to finish, then stops.

It has been proposed to mask the lingering, bitter taste of RebA by the addition of masking agents such as arabinocalactane (US 2002/0004092). Further typical examples of compounds that mask such off-notes can be found in United States published application No. 2010/227039.

Nevertheless there still remains a need for further and better methods and products having a good flavor profile, enhanced sucrose-like sweetness profile (without using sucrose), and possessing fewer off-notes.

Most fruits contain acid. Accordingly, fruit juice and beverages containing a substantive amount of fruit juice are acidic (pH from about 2 to 4). To possess an authentic fruit juice taste, it is common to acidify flavored beverages with naturally occurring organic acids such as citric acid, malic acid and rarely with fumaric and/or tartaric acid. These acids are used nowadays in combination with citrate buffers to smoothen the acidity.

An essential aspect of the disclosure relates to the recognition that the presence of citrates, which are used as buffers to smoothen the acidity of flavored beverages, causes an enhancement of the lingering, bitter taste of RebA.

It has been found that the lingering, bitter taste of RebA in an acidified beverage can be perceptibly decreased or even eliminated by the addition of glucono delta-lactone (GDL; CAS 90-80-2). Further it was surprisingly found that the presence of GDL, which is commonly known as an acidifier, makes the presence of a buffer redundant.

In one aspect there is provided a flavored beverage product comprising
a) an organic acid
b) glucono delta lactone; and
c) Rebaudiside A.

The organic acid may be selected from a broad range of organic acids, such as citric acid, malic acid, fumaric acid, tartaric acid, lactic acid, ascorbic acid, oxalic acid, malonic acid, uronic acid, quinic acid, succinic acid, levulinic acid, and mixtures thereof.

In one embodiment, the organic acid is selected from organic acids, which are naturally occurring in fruits, such as citric acid, malic acid, fumaric acid, and tartaric acid, and mixtures thereof (e.g. fumaric acid combined with tartaric acid or malic acid).

In another embodiment there is provided a flavored beverage essentially free of citrate, comprising RebA, glucono delta lactone, and an acid selected from citric acid, malic acid, fumaric acid and tartaric acid, said beverage having a pH from about 2 to about 4.

It has been found that citric acid may also enhance the undesired off-notes of RebA. Thus in certain embodiments, the acidity is partially or totally replaced by an acid selected from malic acid, fumaric acid, tartaric acid, and mixtures thereof, optionally admixed with citric acid. Where citric acid is employed, it may be used at levels of 50 mol % (e.g. 25 mol %, 20 mol %, 15 mol %, 10 mol %) or less based on the total amount of acids.

Pure glucono delta lactone (GDL) is a white odorless crystalline powder which is soluble in water. It is a naturally-occurring food additive and is used in food industry as an acidifier, for example, for baking powder and as a curing agent for meat products. GDL may directly be admixed, as a solid, with the beverage. Optionally, a concentrated aqueous solution may be prepared (stock-solution) which then may be admixed with the beverage. It may be used at levels of about 0.005 to 0.4% by weight, e.g. about 0.01 to 0.2% by weight, based on the final product (i.e. the product in its final concentration to be swallowed).

In one embodiment, there is provided a flavored beverage comprising an organic acid (a), glucono delta lactone (b) and Rebaudioside A (c) wherein the mole ration of acid (a) to glucono delta lactone (b) is from about 4:1 to 1:1, for example, about 3:1 to 2:1, and the beverage is essentially free of citrate.

The RebA can be obtained, for example, by extraction or the like from the *stevia* plant. *Stevia* (e.g. Stecia *rebaudiana* Bertoni) is a sweet-tasting plant. Its leaves contain a complex mixture of diterpene glycosides possessing a sweet taste. Rebaudiosides are components of *Stevia* that contribute to sweetness. Using standard processes, RebA is obtained in purities of 90% and higher (e.g. purity between 95-99% such as 97%).

The beverage may comprise RebA in concentrations of about 30 ppm-about 750 ppm (e.g. from about 50 ppm up to 350 ppm). However the amount added mainly depends on the level of sweetness desired and may depend on the presence of other ingredients. For example, fruit juice comprises sugar and thus contributes to the level of sweetness.

In one embodiment, RebA is the only sweetener added to the flavored beverage.

In another embodiment, RebA may be combined with other sweetener and/or sweetness enhancers.

Examples of suitable sweeteners and sweetness enhancers include sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, and saccharine, and mixtures thereof; trilobatin, hesperetin dihydrochalcone glucoside, naringin dihydrochalcone, mogroside V, Luo Han Guo extract, rubusoside, rubus extract, glycyphyllin, isomogroside V, mogroside IV, siamenoside I, neomogroside, mukurozioside IIb, (+)-hernandulcin, 4 β-hydroxyhernandulcin, baiyunoside, phlomisoside I, bryodulcoside, bryoside bryonoside, abrusosides A-E, cyclocarioside A, cyclocaryoside I, albiziasaponins A-E, glycyrrhizin, araboglycyrrhizin, periandrins I-V, pterocaryosides A and B, osladin, polypodosides A and B, telosmoside A8-18, phyllodulcin, huangqioside E neoastilbin, monatin, 3-acetoxy-5,7-dihydroxy-4'-methoxyflavanone, 2R,3R-(+)-3-Acetoxy-5,7,4'-trihydroxyflavanone, (2R,3R)-dihydroquercetin 3-O-acetate, dihydroquercetin 3-O-acetate 4'-methyl ether, brazzein, curculin, mabinlin, monellin, neoculin, pentadin, thaumatin, and combinations thereof. Some of the compounds listed above are known sweetness enhancers as well as sweeteners. When used as sweetness enhancers they are normally used below their sweetness detection thresholds.

By "flavored beverage" it is meant any beverage to which flavor agent is added, for example, in form of a flavor composition created by a flavorist using methods known to the skilled person. A beverage to which a juice derived from a plant or parts thereof (for example from leafs, flowers and/or fruits) is added may also fall under the term "flavored beverage". Also included are beverages to which both, flavor compositions and juice are added.

Examples of suitable flavor agents include natural flavors, artificial flavors, spices, seasonings, and the like. Exemplary flavor agents include synthetic flavor oils and flavoring aromatics and/or oils, oleoresins, essences, and distillates, and a combination comprising at least one of the foregoing.

Flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, and so forth.

Additional exemplary flavors imparted by a flavoring agent include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Generally any flavoring or food additive such as those described in "Chemicals Used in Food Processing", Publication No 1274, pages 63-258, by the National Academy of Sciences, can be used. This publication is incorporated herein by reference.

In one embodiment, the beverage is flavored with a flavor agent selected from fruit flavor, fruit flavor compositions and fruit juice, or mixtures thereof.

The term "fruit flavor" as used herein means any ingredient which possesses a fruity taste, i.e. a taste relating to, or resembling fruit. By fruit is meant the edible product of a plant consisting of the seed and its envelope (especially when sweet, juicy, and/or pulpy) and other parts of plant, such as the stalks e.g. from rhubarb. Examples for fruit flavors are apple, apricot, banana, berry, blackcurrant, cherry, citrus, fig, gooseberry, grape, grapefruit, guava, lemon, mango, melon, orange, passionfruit, peach, pear, pineapple, rhubarb, raisin, raspberry, strawberry, and the like, or mixtures thereof.

The term "beverage" as used herein means any drinkable liquid or semi-liquid, including for example: flavored water, soft drinks, fruit drinks, coffee-based drinks, tea-based drinks, juice-based drinks (includes fruit and vegetable), acidified dairy based beverages (including milk, whey and yoghurt based beverages), gel drinks, carbonated or non-carbonated drinks, alcoholic or non-alcoholic drinks, including sport drinks, energy drinks, isotonic drinks, drink sticks and syrups and liquid concentrates. A beverage product includes ready-to-drink products and liquid and dry concentrates (for examples powders or granulates) which are indented to be dissolved in water before consumption.

The flavored beverage product as described herein may be prepared using methods generally know to the skilled person. Preferably, glucono delta lactone may be dissolved in water before being admixed with the other ingredients, such as flavor, organic acids, preservatives, colors, and the like.

In certain embodiments, the flavored beverage product is natural in that it contains only natural ingredients or ingredients derived from natural sources.

In another embodiment, the flavored beverage product may contain artificial and/or synthetic ingredients.

The disclosure is further described with reference to the following worked example, which describes a particular embodiment.

These examples are for the purpose of illustration only and it is understood that variations and modifications can be made by one skilled in the art without departing from the scope of the claims. It should be understood that the embodiments described are not only in the alternative, but can be combined.

EXAMPLE 1

Water Flavored with Cherry Flavor

| Ingredient (% by weight) | 1-A | 1-B |
|---|---|---|
| Cherry flavour (Givaudan SA) | 0.1 | 0.1 |
| Rebaudioside A | 0.035 | 0.035 |
| Tartaric acid (150 MW) | 0.068 | 0.091 |
| Malic acid (134 MW) | 0.0203 | 0.027 |
| Glucono Delta Lactone (178 MW) (10% aqueous solution) | 0.35 | 0 |
| K citrate | 0 | 0.009 |
| Water | ad 100 | ad 100 |
| pH | 2.8 | 2.8 |

A group of trained panelists (17 people) have been asked to evaluate the two samples, which have been presented blind.

The majority of panelist preferred sample 1-A. They describe sample 1-A compared to 1-B as less bitter, less lingering, less sour, sweetener and more flavorful.

EXAMPLE 2

Water Flavoured with Grape Flavour

| Ingredient (% by weight) | 2-A | 2-B |
| --- | --- | --- |
| Grape flavour (Givaudan SA) | 0.1 | 0.1 |
| Rebaudioside A | 0.035 | 0.035 |
| Tartaric acid (150 MW) | 0.091 | 0.121 |
| Glucono Delta Lactone (178 MW) (10% aqueous solution) | 0.35 | 0 |
| K citrate | 0 | 0.009 |
| Water | ad 100 | ad 100 |
| pH | 2.8 | 2.8 |

A group of trained panelists (17 people) have been asked to evaluate the two samples, which have been presented blind.

The majority of panelist preferred sample 2-A. They describe sample 2-A compared to 2-B as less bitter, less acidic/sour and the flavor as richer, more complex.

EXAMPLE 3

Mango Beverage

| Ingredient (% by weight) | 3-A | 3-B | 3-C |
| --- | --- | --- | --- |
| Mango flavour (Givaudan SA) | 0.04 | 0.04 | 0.04 |
| Rebaudioside A | 0.035 | 0.035 | 0.035 |
| Citric acid (192 MW) | 0 | 0 | 0.155 |
| Malic acid (134 MW) | 0.150 | 0.081 | 0 |
| Glucono Delta Lactone (10% aqueous solution) | 0 | 0.35 | 0 |
| Na citrate | 0.010 | 0 | 0.041 |
| Water | ad 100 | ad 100 | ad 100 |
| pH | 3.0 | 3.0 | 3.0 |

A group of trained panelists have been asked to compare two samples, which have been presented blind. The results are given below.

The following combinations have been tested:

The comparison of sample 3-A with sample 3-B resulted in a preference for 3-B of the majority of panelists. Sample 3-B was described as less sour, less bitter and more flavorful.

The comparison of sample 3-B with sample 3-C resulted in a preference for 3-B of the majority of panelists. Sample 3-B was described as less sour, less lingering, better sweet/sour balance.

The invention claimed is:

1. An acidified, flavoured beverage product comprising:
 a) an organic acid;
 b) glucono delta lactone; and
 c) Rebaudioside A,
 wherein the beverage product is essentially free of citrate buffers.

2. The beverage product according to claim 1 wherein the acid is selected from fumaric acid, tartaric acid, malic acid, citric acid, lactic acid, ascorbic acid, oxalic acid, malonic acid, uronic acid, quinic acid, succinic acid, levulinic acid, and mixtures thereof.

3. The beverage product according to claim 1 wherein citric acid is present in 50 mol % or less based on the total amount of acids.

4. The beverage product according to claim 1, wherein the flavoured beverage has a pH in the range of about 2 to about 4.

5. The beverage product according to claim 1 flavored with a flavor agent selected from fruit flavor, fruit flavor compositions and fruit juice, and mixtures thereof.

6. The beverage product according to claim 5, wherein the flavor agent is selected from natural and/or artificial flavor ingredients.

7. The beverage product according to claim 1, wherein the mole ratio of acid (a) to glucono delta lactone (b) is from 4:1 to 1:1.

8. The beverage product according to claim 1, wherein the concentration of Rebaudioside A in the beverage product is from about 30 ppm to about 750 ppm.

9. The beverage product according to claim 1, wherein the concentration of Rebaudioside A in the beverage product is from about 50 ppm to 350 ppm.

* * * * *